United States Patent
Ramaswamy et al.

(10) Patent No.: US 12,081,133 B2
(45) Date of Patent: Sep. 3, 2024

(54) CURRENT CONTROL TECHNIQUES FOR DC/DC CONVERTER

(71) Applicant: Caterpillar Inc., Peoria, IL (US)

(72) Inventors: Jyothiraditya Ramaswamy, TamilNadu (IN); Yingying Kuai, Dunlap, IL (US); Gholamreza Esmaili, San Diego, CA (US)

(73) Assignee: Caterpillar Inc., Peoria, IL (US)

( * ) Notice: Subject to any disclaimer, the term of this patent is extended or adjusted under 35 U.S.C. 154(b) by 216 days.

(21) Appl. No.: 17/874,545

(22) Filed: Jul. 27, 2022

(65) Prior Publication Data
US 2024/0039415 A1    Feb. 1, 2024

(51) Int. Cl.
*H02M 3/335* (2006.01)
*H02M 1/00* (2006.01)

(52) U.S. Cl.
CPC ..... *H02M 3/33584* (2013.01); *H02M 1/0058* (2021.05)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; Y02B 70/1491
See application file for complete search history.

(56) References Cited

U.S. PATENT DOCUMENTS

| | | | |
|---|---|---|---|
| 9,306,463 B2* | 4/2016 | Huang | H02M 3/33576 |
| 10,756,617 B2* | 8/2020 | Wei | H02M 1/083 |
| 10,804,808 B1 | 10/2020 | Fu et al. | |
| 2022/0014106 A1 | 1/2022 | Askarianabayaneh et al. | |
| 2022/0393566 A1* | 12/2022 | Tsukada | H02P 27/06 |

FOREIGN PATENT DOCUMENTS

CN    112713780    3/2022

OTHER PUBLICATIONS

Feng Fan et al: "Impedance Shaping of Isolated Two-Stage AC-DC-DC Converter for Stability Improvement", IEEE Access, vol. 7, Feb. 16, 2019 (Feb. 16, 2019), pp. 18601-18610, XP011710754, DOI: 10.1109/ACCESS.2019.2892080, [retrieved on Feb. 16, 2019], p. 18602; figures 1,5,8,10.

(Continued)

*Primary Examiner* — Jeffrey A Gblende

(57) ABSTRACT

A fundamental harmonic matching control technique (FHMT) can optimize the use of the switching devices needed to operate a dual active bridge DC/DC converter, which reduces the peak and RMS currents thereby reducing the switching power losses. The FHMT control techniques can also reduce the current rating of the switching devices, transformer, and the inductor of the dual active bridge DC/DC converter.

20 Claims, 9 Drawing Sheets

(56) References Cited

OTHER PUBLICATIONS

Huang Jun et al: "Unified Triple-Phase-Shift Control to Minimize Current Stress and Achieve Full. Soft-Switching of Isolated Bidirectional,DC-DC Converter", IEEE Transactions on Industrial Electronics, IEEE Service Center, Piscataway, NJ, USA,vol. 63, No. 7, Jul. 1, 2016 (Jul. 1, 2016), pp. 4169-4179, XP011613586,ISSN: 0278-0046, DOI:10.1109/TIE.2016.2543182, [retrieved on Jun. 9, 2016] p. 4170-p. 4175; figures 1,5 abstract.
Nguyen Thanh Lich et al: "Modeling and control of dual active bridge converter with two control loops and output filter", IECON 2017—43rd Annual Conference of the IEEE Industrial Electronics Society, IEEE, Oct. 29, 2017 (Oct. 29, 2017), pp. 4683-4689, XP033280239, DOI: 10.1109/IECON.2017.8216807,[retrieved on Dec. 15, 2017] abstract; figures 5, 9.
Written Opinion and International Search Report for Int'l. Patent Appln. No. PCT/US2023/068694, mailed Oct. 19, 2023 (13 pgs).
"Design Guide: TIDA-010054—Bidirectional, Dual Active Bridge Reference Design for Level 3 Electric Vehicle Charging Stations", Texas Instruments, (2019), 86 pgs.
Oggier, German G, "Extending the ZVS Operating Range of Dual Active Bridge High-Power DC-DC Converters", 2006 37th IEEE Power Electronics Specialists Conference, Jeju, South Korea, (2006), 7 pgs.

\* cited by examiner

1202 — COMPARE A REPRESENTATION OF A FIRST HARMONIC OF THE FIRST VOLTAGE AND A REPRESENTATION OF A FIRST HARMONIC OF THE SECOND VOLTAGE

1204 — DETERMINE AN ADJUSTMENT FACTOR THAT, WHEN APPLIED, REDUCES A DIFFERENCE BETWEEN THE REPRESENTATION OF THE FIRST HARMONIC OF THE FIRST VOLTAGE AND THE REPRESENTATION OF A FIRST HARMONIC OF THE SECOND VOLTAGE

1206 — DETERMINE, USING THE ADJUSTMENT FACTOR, A PHASE SHIFT ANGLE THAT, WHEN APPLIED TO A CONTROL SIGNAL OF AT LEAST ONE OF THE FIRST PLURALITY OF ELECTRONIC SWITCHES OR TO A CONTROL SIGNAL OF AT LEAST ONE OF THE SECOND PLURALITY OF ELECTRONIC SWITCHES, REDUCES A PEAK CURRENT IN AN INDUCTOR COUPLED BETWEEN THE FIRST FULL BRIDGE CIRCUIT AND THE PRIMARY WINDING OF THE TRANSFORMER

FIG. 12

CURRENT CONTROL TECHNIQUES FOR DC/DC CONVERTER

TECHNICAL FIELD

This document relates generally to a DC/DC converter and a method of reducing an inductor current in a dual active bridge DC/DC converter.

BACKGROUND

In high power applications, bridge-type bidirectional converters are common choices for use as power transfer units. A dual active full bridge converter can be used to transfer power. The dual active bridge converter (DAB) is a buck and a boost bidirectional DC/DC converter, based on two active full bridge circuits interfaced through a high frequency transformer.

Although conventional dual active bridge control has bidirectional power flow capability that meets various converter requirements, it has certain challenges associated with it, such as high peak current and RMS current flowing through its transformer due to high instantaneous voltage drop across the inductor. These challenges can cause high switching power loss by the switching devices in the converter, which imposes a heavy cooling requirement to maintain the junction temperature of switching devices within acceptable limits of system design. Also, due to the high peak current, the device ratings of the switching devices, transformer, and the inductor of the dual active bridge DC/DC converter need to be rated for high current U.S. Pat. No. 10,804,808 describes a system and method of controlling a direct current to direct current converter that comprises a primary full bridge coupled to a secondary full bridge via a transformer. After the start-up time period, an electronic data processor controls the converter to operate efficiently in a first control mode, a second control mode, or a third control mode, wherein the first control mode comprises a phase shift mode, the second control mode comprises a triangular waveform control mode and wherein the third control mode comprises a trapezoidal waveform control mode. The electronic data processor determines a maximum target power range and a transition power level threshold for each one of the control modes.

SUMMARY

This disclosure describes a fundamental harmonic matching control technique (FHMT) to overcome the challenges mentioned above. The FHMT control optimizes the use of the switching devices needed to operate a dual active bridge DC/DC converter, which reduces the peak and root mean square (RMS) currents thereby reducing current rating of the switching devices, transformer, and the inductor of the dual active bridge DC/DC converter.

In an aspect, this disclosure is directed to a dual active bridge DC/DC converter comprising: a first full bridge circuit including a first plurality of electronic switches, the first full bridge circuit configured to generate a first voltage; a second full bridge circuit including a second plurality of electronic switches, the second full bridge circuit configured to generate a second voltage; a transformer coupled between the first full bridge circuit and the second full bridge circuit; an inductor coupled between the first full bridge circuit and a primary winding of the transformer; and a control circuit configured to: compare a representation of a first harmonic of the first voltage and a representation of a first harmonic of the second voltage; determine an adjustment factor that, when applied, reduces a difference between the representation of the first harmonic of the first voltage and the representation of the first harmonic of the second voltage; and determine, using the adjustment factor, a phase shift angle that, when applied to a control signal of at least one of the first plurality of electronic switches or to a control signal of at least one of the second plurality of electronic switches, reduces a peak current in the inductor.

In another aspect, this disclosure is directed to a method of reducing an inductor current in a dual active bridge DC/DC converter, wherein the dual active bridge DC/DC converter includes a first full bridge circuit having a first plurality of electronic switches, the first full bridge circuit configured to generate a first voltage, a second full bridge circuit including a second plurality of electronic switches, the second full bridge circuit configured to generate a second voltage, a transformer coupled between the first full bridge circuit and the second full bridge circuit, and an inductor coupled between the first full bridge circuit and a primary winding of the transformer, the method comprising: comparing a representation of a first harmonic of the first voltage and a representation of a first harmonic of the second voltage; determining an adjustment factor that, when applied, reduces a difference between the representation of the first harmonic of the first voltage and the representation of a first harmonic of the second voltage; and determining, using the adjustment factor, a phase shift angle that, when applied to a control signal of at least one of the first plurality of electronic switches or to a control signal of at least one of the second plurality of electronic switches, reduces a peak current in an inductor coupled between the first full bridge circuit and the primary winding of the transformer.

In yet another aspect, this disclosure is directed to an electric powertrain comprising: an electrically drivable load; a DC power source; and a dual active bridge DC/DC converter coupled to the DC power source, the dual active bridge DC/DC converter comprising: a first full bridge circuit including a first plurality of electronic switches, the first full bridge circuit configured to generate a first voltage; a second full bridge circuit including a second plurality of electronic switches, the second full bridge circuit configured to generate a second voltage; a transformer coupled between the first full bridge circuit and the second full bridge circuit; an inductor coupled between the first full bridge circuit and a primary winding of the transformer; and a control circuit configured to: compare a representation of a first harmonic of the first voltage and a representation of a first harmonic of the second voltage; determine an adjustment factor that, when applied, reduces a difference between the representation of the first harmonic of the first voltage and the representation of the first harmonic of the second voltage; and determine, using the adjustment factor, a phase shift angle that, when applied to a control signal of at least one of the first plurality of electronic switches or to a control signal of at least one of the second plurality of electronic switches, reduces a peak current in the inductor.

BRIEF DESCRIPTION OF THE DRAWINGS

FIG. 12 is a flow diagram of a method of reducing an inductor current in the dual active bridge DC/DC converter, in accordance with an embodiment of the present disclosure.

DETAILED DESCRIPTION

This disclosure describes a fundamental harmonic matching control technique (FHMT) using a dual active bridge DC/DC converter to overcome the challenges typically encountered with use of conventional DC/DC converter systems or conventional techniques for controlling operation of a DC/DC converter. A dual active bridge DC/DC converter includes two full bridge circuits, each including a plurality of electronic switches. The FHMT control optimizes the use of the electronic switches needed to operate the dual active bridge DC/DC converter, which reduces the peak and RMS currents thereby reducing current ratings of the switching devices, transformer, and the inductor of the dual active bridge DC/DC converter.

Figure 1:
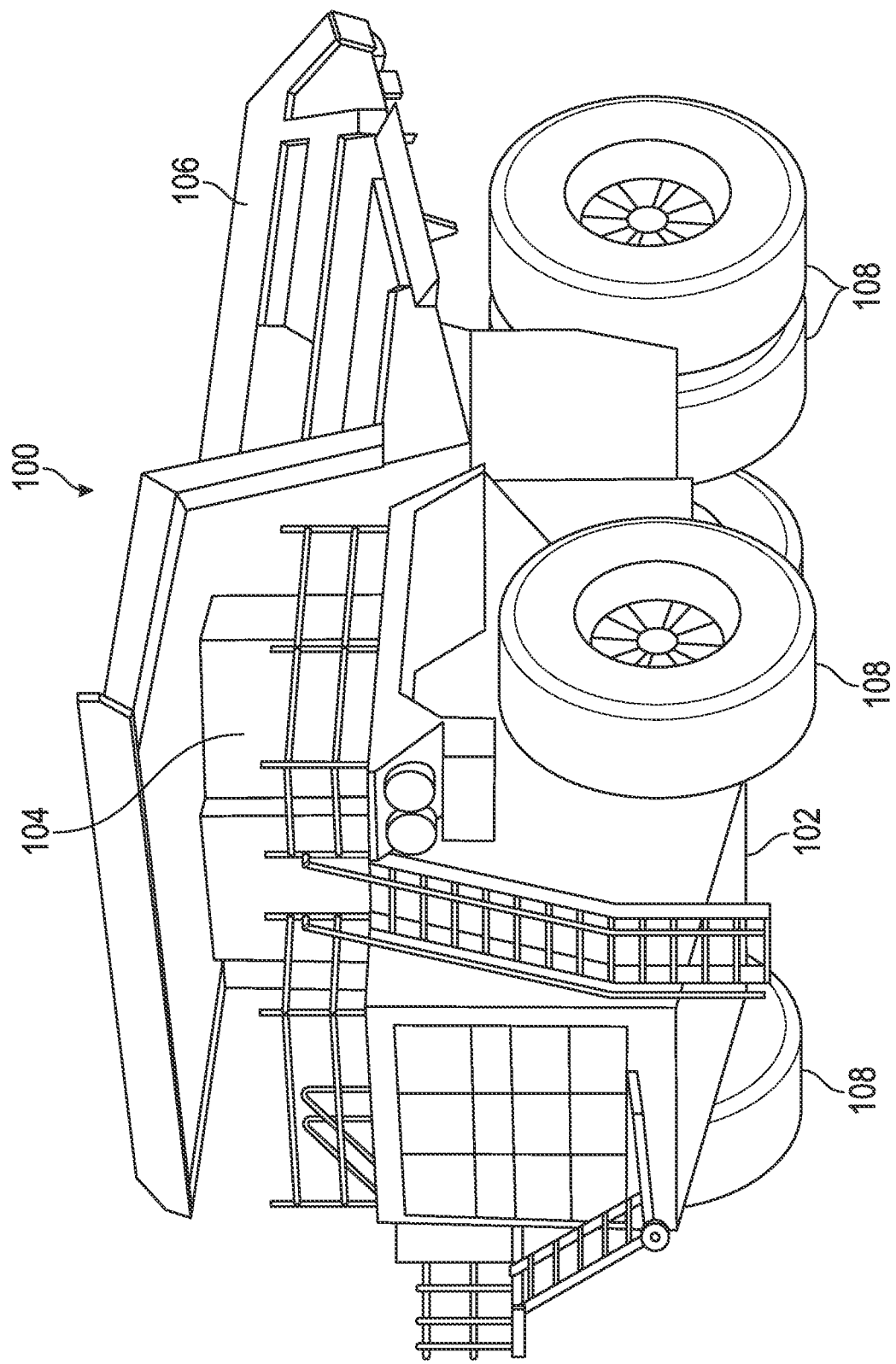
FIG. 1 is a perspective view of an example of an electric machine that can implement various dual active bridge DC converter techniques of this disclosure.

FIG. 1 is a perspective view of an example of an electric machine that can implement various dual active bridge DC converter techniques of this disclosure. A non-limiting example of an electric machine 100 is shown in FIG. 1. The electric machine 100 can be any stationary, or mobile, machine powered, at least partially, by batteries, as will be described below with reference to FIG. 2. The electric machine 100 can be a mining truck, as depicted, or may alternatively embody an on-highway or off-highway machine or any other vehicle that is configured to be propelled. In some examples, the electric machine 100 includes a frame 102 supporting at least an operator control station 104 and a dump body 106. Ground-engaging elements 108, such as wheels and/or tires, may also be supported by the frame 102, and can be powered by a drive system, discussed below, supported by the frame 102.

Figure 2:
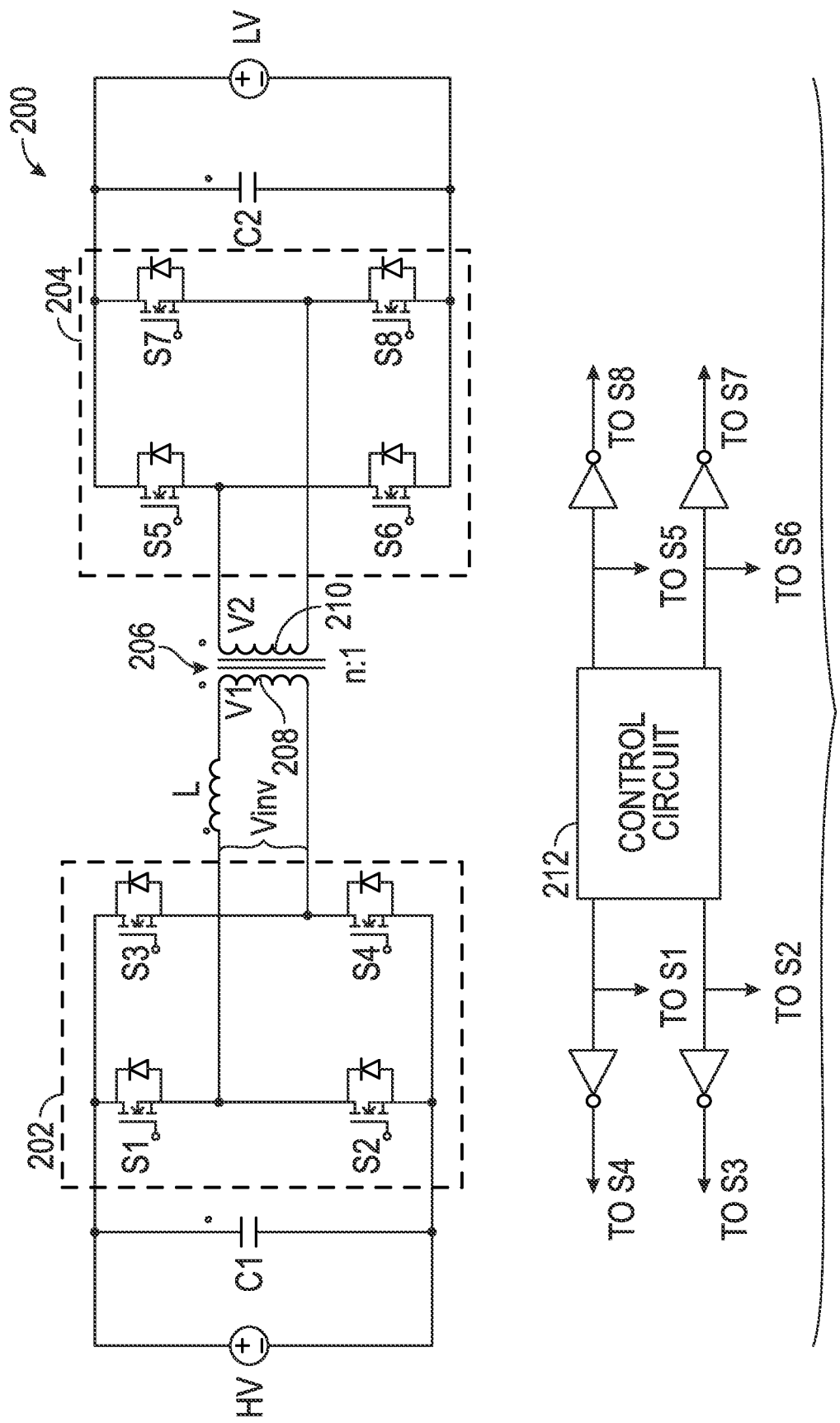
FIG. 2 is a schematic illustration of a dual active bridge DC/DC converter that can be used by the machine of FIG. 1, in accordance with an embodiment of this disclosure.

FIG. 2 is a schematic illustration of a dual active bridge DC/DC converter 200 that can be used by the machine of FIG. 1. In some examples, the dual active bridge DC/DC converter 200 includes a first full bridge circuit 202 that includes a plurality of electronic switches S1-S4 and a second full bridge circuit 204 that includes a plurality of electronic switches S5-S8. The dual active bridge DC converter 200 includes a transformer 206 coupled between the first full bridge circuit 202 and the second full bridge circuit 204. The transformer 206 includes a turns ratio of n:1. The dual active bridge DC converter 200 includes an inductor L coupled between the first full bridge circuit 202 and a primary winding 208 of the transformer 206.

The first full bridge circuit 202 is configured to generate a voltage V1 at the primary winding 208 of the transformer 206 and the second full bridge circuit 204 is configured to generate a voltage V2 at a secondary winding 210 of the transformer 206. A control circuit 212 is configured to, among other things, generate control signals to control operation of the switches S1-S8 so that the first full bridge circuit 202 and the second full bridge circuit 204 can generate the voltages V1, V2, respectively. The sets of switches (S1, S2), (S4, S3), (S5, S6) and (S8, S7) are complementary pairs with each switch operating at 50% duty cycle respectively. Thus, if S1 is ON then S2 will be OFF and if S1 is OFF then S2 will be ON, for example.

The first full bridge circuit 202 is coupled to a first voltage source HV and a capacitor C1. The second full bridge circuit 204 is coupled to a second voltage source LV and a capacitor C2.

Figure 11:
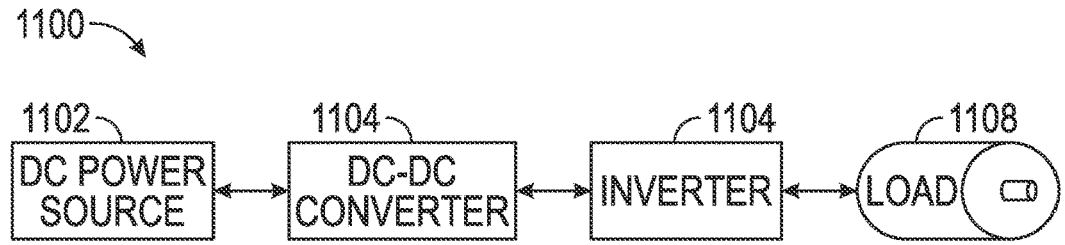
FIG. 11 is a diagrammatic view of an example of an electric powertrain using the DC/DC converter of the present disclosure.

Electric machines are powered by batteries instead of an engine. A battery pack can include one or more battery modules, and a battery module can include one or more battery cells. The second voltage source LV can include one or more battery modules. The first voltage source HV can include a DC bus, such as coupled to an electric load, such as a motor of an electric machine, via an inverter, as shown in FIG. 11.

Using various techniques as described hereinafter, the control circuit 212 of this disclosure can implement a Fundamental Harmonic Matching Technique (FHMT) control strategy that optimizes the use of the switches S1-S8 needed to operate the converter, reducing the peak and RMS currents flowing through the transformer 206. More particularly, the control circuit 212 can compare a representation of a first harmonic of the first voltage generated by a first full bridge circuit of the dual active bridge DC/DC converter and a representation of a first harmonic of the second voltage generated by a second full bridge circuit of the dual active bridge DC/DC converter and determine an adjustment factor ζ that, when applied, reduces a difference between the representation of the first harmonic of the first voltage and the representation of the product of the turns ratio of the transformer and the first harmonic of the second voltage. Then, the control circuit 212 can determine, using the adjustment factor ζ, a phase shift angle α that, when applied to a control signal of at least one of the switches S1-S4 or to a control signal of at least one of the electronic switches S5-S8, reduces a peak current in the inductor L. As described below, the dual active bridge DC converter 200 has two degrees of freedom to control the transfer of power, which can improve the performance of the converter of this disclosure over conventional, or traditionally known, single-phase-shift (SPS) control techniques.

Figure 3:
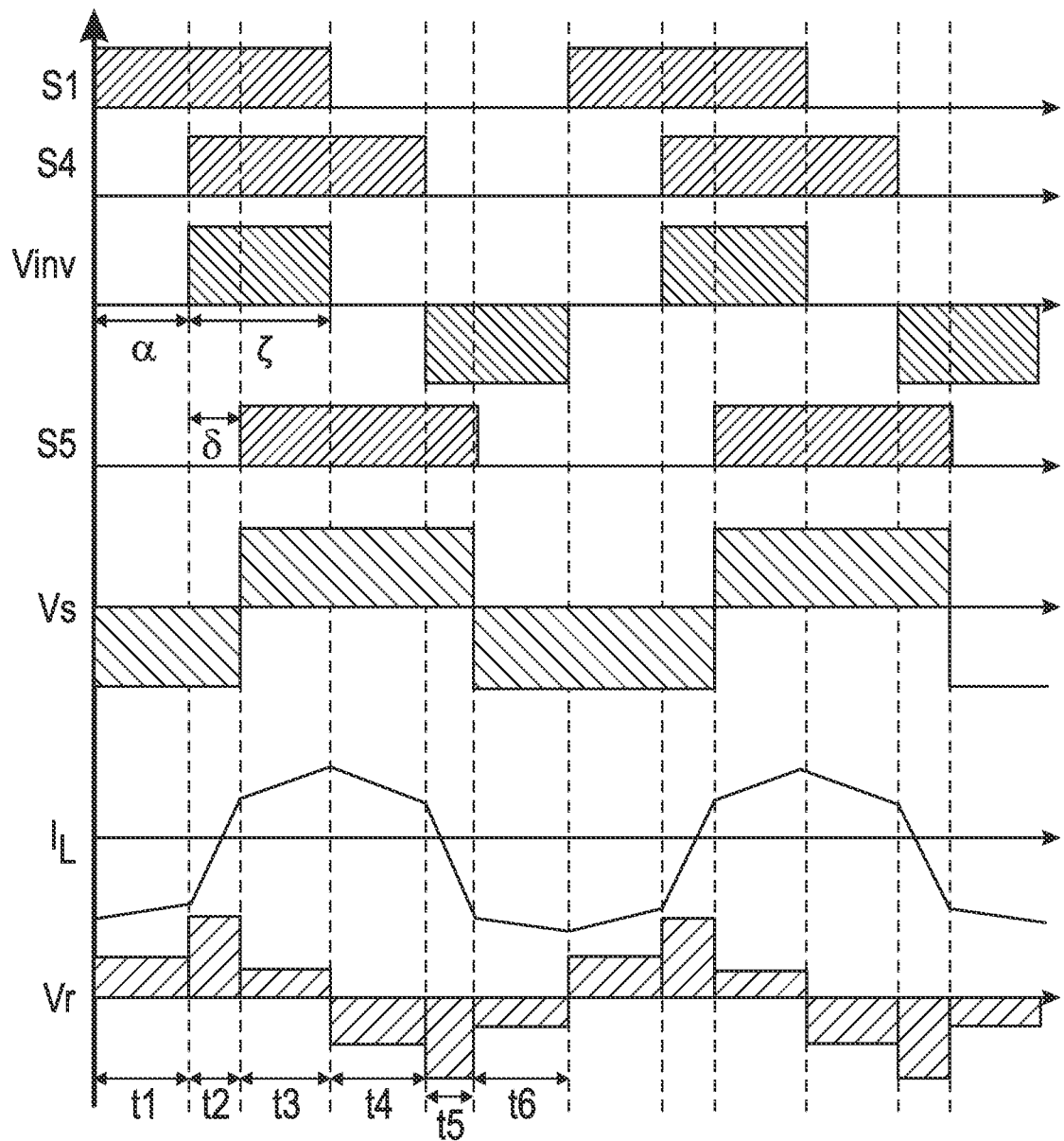
FIG. 3 is a timing diagram of the dual active bridge DC converter operating in a first mode of operation, in accordance with an embodiment of this disclosure.

FIG. 3 is a timing diagram of a dual active bridge DC converter operating in a first mode of operation, in accordance with various techniques of this disclosure. FIG. 3 depicts operation of a dual active bridge DC/DC converter, such as the dual active bridge DC/DC converter 200 of FIG.

2, when a voltage of the first voltage source HV coupled to the first full bridge circuit 202 is greater than or equal to a product of the turns ratio of the transformer 206 and a voltage of a second voltage source LV coupled to the second full bridge circuit 204, or HV≥n*LV. FIG. 3 depicts waveforms for the control signals controlling switches S1, S4, and S5 of FIG. 2, the voltage Vinv, which is the output voltage of the first full bridge circuit 202, the voltage Vs, which is the output voltage of the second full bridge circuit 204 (shown as V2 in FIG. 2), the current $I_L$ through the inductor L of FIG. 2, and the voltage Vr, which is the voltage across the inductor L of FIG. 2, where Vinv−Vs=Vr.

A control circuit, such as the control circuit 212 of FIG. 2, can use two angles, a power angle (δ) and a modulation angle (ζ) where the modulation angle (ζ) is an angle that corresponds to the adjustment factor, to modulate the switches S1-S8 and determine the behaviors of the inductor current $I_L$ for each interval. These angles determine the power flow between two DC voltages, e.g., HV and LV, for the two modes of operation.

The first harmonic component of the primary voltage in RMS is given by Equation 1:

$$Vinv(1) = \frac{2*HV*\sqrt{1-\cos(\alpha)}}{\pi} \quad \text{Equation 1}$$

where HV is the voltage of the first voltage source HV coupled to the first full bridge circuit 202.

The first harmonic component of the secondary voltage in RMS is given by Equation 2:

$$Vs(1) = \frac{2\sqrt{2}*LV}{\pi} \quad \text{Equation 2}$$

where LV is the voltage of the second voltage source LV coupled to the second full bridge circuit 204.

The Fundamental Harmonic ng Technique (FHMT) is defined using Equation 3:

$$Vinv(1)=n*Vs(1) \quad \text{Equation 3}$$

Solving this equation results in Equations 4 and 5:

$$\alpha = 2*A\cos\left(\frac{n*LV}{HV}\right) \quad \text{Equation 4}$$

where n is the turns ratio of the transformer 206 of FIGS. 2, and $$\zeta = \pi - 2*A\cos\left(\frac{n*LV}{HV}\right) \quad \text{Equation 5}$$

A control circuit, such as the control circuit 212 of FIG. 2, can find the first harmonic components of the primary and secondary sides using Equations 1 and 2, compare them using Equation 3, and find a value of ζ using Equation 5 so that the fundamental harmonic components substantially match.

When HV≥n*LV, the output voltage Vs of the second full bridge circuit 204 is a square waveform with no modulation and the output voltage Vinv of the first full bridge circuit 202 is a modulated square waveform Vinv. The power angle δ between the two full bridges is used to regulate the power flow between the LV and HV DC buses, and the direction of power flow, e.g., LV to HV or HV to LV, is determined by the power angle δ. The control signal of the switch S5 of the second full bridge circuit 204 is phase shifted by a power angle δ with respect to switch S4. The control signals of the switches S1 and S4 of the first kill bridge circuit 202 are phase shifted by the modulation angle α, and the angle ζ is the pulse width applied to the primary side voltage, which is calculated using the FHMT method.

In FIG. 3, the control circuit 212 applies a phase shift angle α to the control signal that controls the switch S1. When the control signal to switch S1 is high and the control signal to switch S4 is low, there is no voltage Vinv (Vinv is zero) and thus no voltage across the transformer 206. When the control signal to switch S1 is high and the control signal to switch S4 is high, there is a high voltage Vinv. When the control signal to switch S1 is low and the control signal to switch S4 is high, there is no voltage Vinv and thus no voltage across the transformer 206.

Relative to the control signal that controls the switch S4, the control circuit 212 also applies a phase shift angle δ (power angle) to the control signal that controls the switch S5 of the second full bridge circuit 204. The switches S5 and S8 operate at the same time, so there is no phase shift between them. As such, the voltage on the LV side is a square wave.

The techniques of this disclosure reduce the slope of the inductor current $I_L$ based on the phase shift between Vinv and Vs. Stated differently, the control circuit can modulate Vinv and Vs to reduce the peak inductor current $I_L$.

Figure 4:
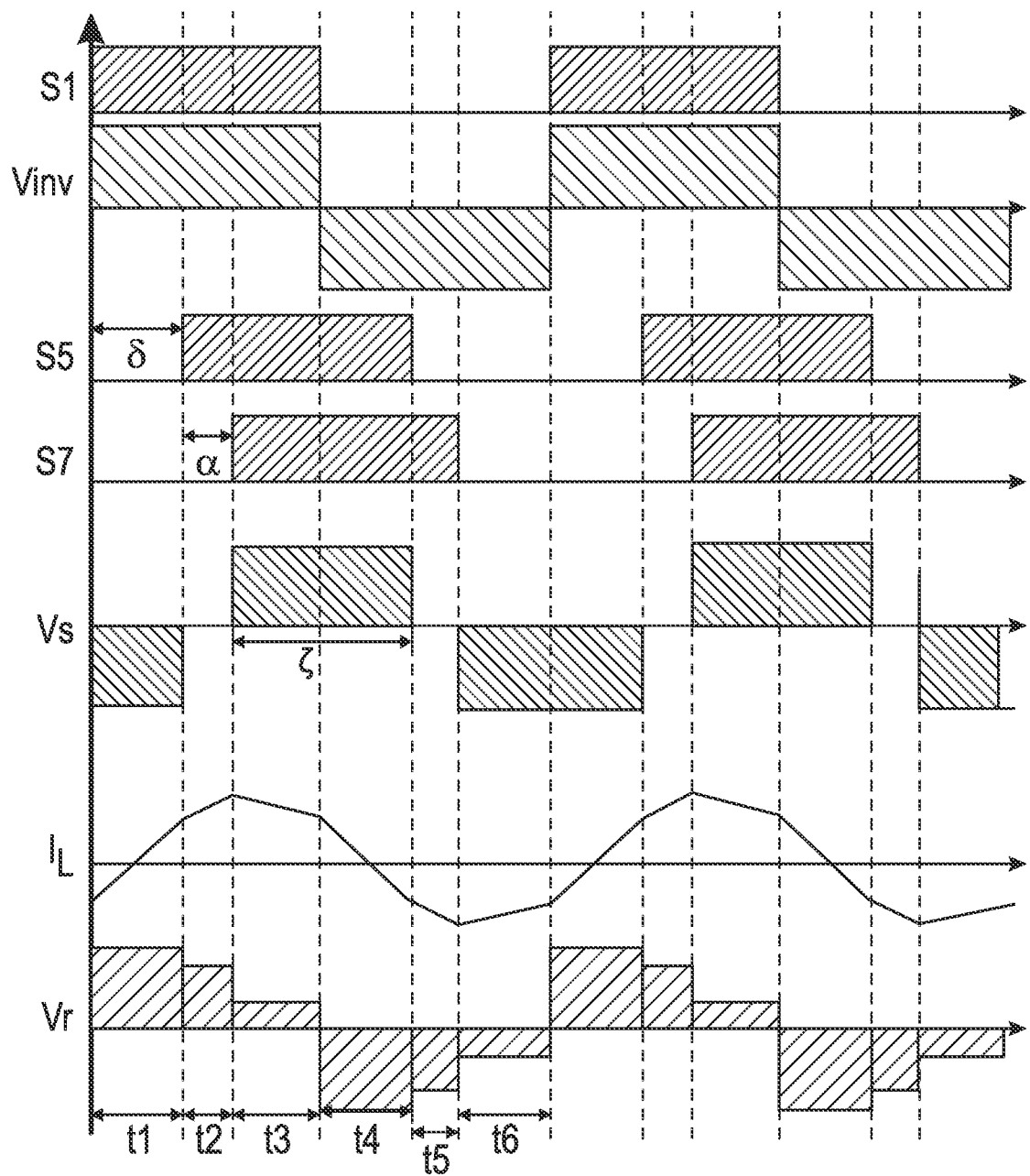
FIG. 4 is a timing diagram of the dual active bridge DC converter operating in a second mode of operation, in accordance with another embodiment of this disclosure.

FIG. 4 is a timing diagram of a dual active bridge DC converter operating in a second mode of operation, in accordance with various techniques of this disclosure. FIG. 4 depicts operation of a dual active bridge DC/DC converter, such as the dual active bridge DC/DC converter 200 of FIG. 2, when a voltage of a first voltage source coupled to the first full bridge circuit 202 is less than a product of a turns ratio of the transformer and a voltage of a second voltage source coupled to the second full bridge circuit 204 (or HV<n*LV) no phase shift angle is applied to the control signal of any of the first plurality of electronic switches. FIG. 4 also depicts waveforms for the control signals controlling switches S1, S5, and S7 of FIG. 2, the voltage Vinv, which is the output voltage of the first full bridge circuit 202, the voltage Vs, which is the output voltage of the second full bridge circuit 204 (shown as V2 in FIG. 2), the current $I_L$ through the inductor L of FIG. 2, and the voltage Vr, which is the voltage across the inductor L of FIG. 2, where Vinv−Vs=Vr.

During the second mode of operation, when HV<n*LV, the output voltage Vinv of the first full bridge circuit 202 is a square waveform with no modulation and the output voltage Vs of the second full bridge circuit 204 is a modulated square waveform. The control signal of the switch S5 of the second full bridge circuit 204 is phase shifted by the power angle with respect to the control signal of the switch S1. Also, the control signal of the switch S7 is phase shifted by the modulation angle (α) with respect to the control signal of the switch S5, and the angle ζ is the pulse width applied to the secondary side voltage which is calculated using the principle of FHMT disclosed herein.

The first harmonic component of the primary voltage in RMS is given by Equation 6:

$$Vinv(1) = \frac{2\sqrt{2}*LV}{\pi} \quad \text{Equation 6}$$

where LV is the voltage of the second voltage source LV coupled to the second full bridge circuit 204.

The first harmonic component of the secondary voltage in RMS is given by Equation 7:

$$V_S(1) = \frac{2*HV*\sqrt{1-\cos(\alpha)}}{\pi} \quad \text{Equation 7}$$

where HV is the voltage of the first voltage source HV coupled to the first full bridge circuit 202.

As disclosed earlier herein, the Fundamental Harmonic Matching Technique (FHMT) is defined using Equation 3:

$$V_{inv}(1) = V_S(1) \quad \text{Equation 3}$$

Solving this equation results in Equations 8 and 9:

$$\alpha = 2*A\cos\left(\frac{HV}{n*LV}\right) \quad \text{Equation 8}$$

where n is the turns ratio of the transformer 206 in FIGS. 2, and $$\zeta = \pi - 2*A\cos\left(\frac{HV}{n*LV}\right) \quad \text{Equation 9}$$

A control circuit, such as the control circuit 212 of FIG. 2, can find the first harmonic components of the primary and secondary sides using Equations 6 and 7, compare them using Equation 3, and find a value of ζ using Equation 9 so that they substantially match.

Using the techniques of this disclosure, the modulation angle (ζ) is calculated by the Fundamental Harmonic Matching Technique (FHMT), as described above, where the first harmonics of the first full bridge circuit 202 and the product of the turns ratio of the transformer and the second full bridge circuit 204 output voltages are matched. This reduces the peak current flowing through the transformer and helps ensure that the power transfer can be controlled by a phase shift between the output voltages using the power angle δ. A current controller of the control circuit compares a representation of a load current and a representation of a reference current, whose difference is passed through a PI controller, for example, of the control circuit with a lower limit of δ=−90° and upper limit of δ=+90°, which then gives an output that directly controls the power angle.

The power angle determines the power transfer and is given by Equation 10:

$$P = n*V1*V2*\frac{(2*\delta*\zeta - 2*\delta*\delta - \zeta*\zeta \mp \zeta*\pi)}{w*L*2\pi}$$

where V1 and V2 are the primary and second transformer winding voltages, respectively, δ is the power angle between the voltages imposed by the bridges, and ζ is the width of the pulse applied to the primary or the secondary side depending on the mode of operation.

The phase shift from the reference leg is represented by α, where α is defined using Equation 11:

$$\alpha = \pi - \zeta \quad \text{Equation 11}$$

Figure 5:
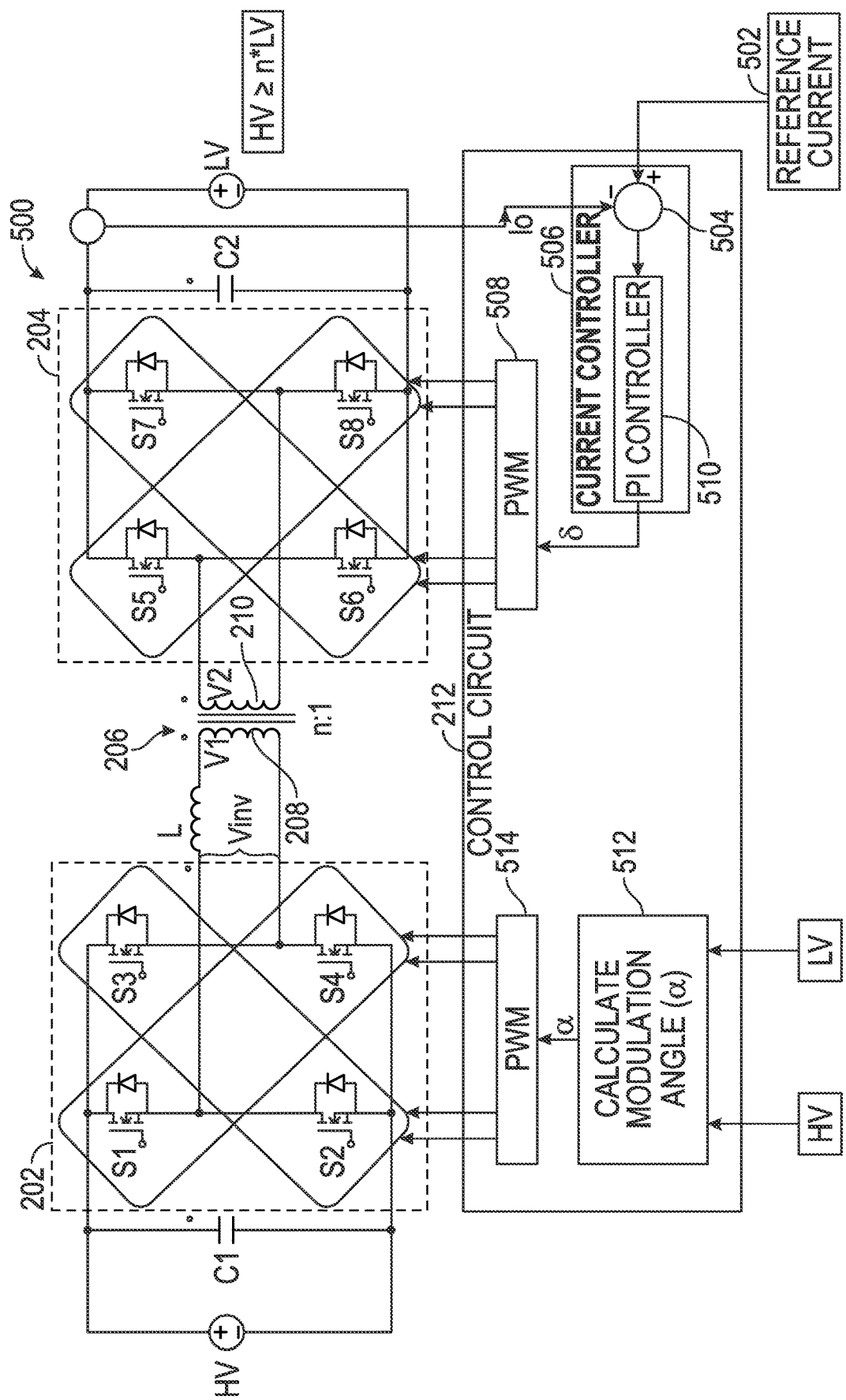
FIG. 5 is a schematic illustration of the dual active bridge DC/DC converter during the first mode of operation where HV≥n*LV.

FIG. 5 is a schematic illustration of the dual active bridge DC/DC converter 500 during a first mode of operation where HV≥n*LV. FIG. 5 includes some components that are similar to components in FIG. 2, which are designated by similar reference numbers. For purposes of conciseness, similar components will not be described in detail again.

The control circuit 212 of the dual active bridge DC/DC converter 500 receives a representation of a reference current 502 and a representation of a load current Io. The representation of the load current Io can be determined using a Hall effect based current sensor. A summing node 504 receives the representation of the reference current 502 and the representation of the load current Io.

The current controller 506 is configured to compare the representation of the load current to and the representation of the reference current, determine a first phase shift angle δ based on the comparison, and then adjust, based on the determined first phase shift angle δ, a control signal of at least one of the plurality of electronic switches S5-S8, such as using the pulse width modulation (PWM) controller 508. As seen in FIG. 5, the switches S5 and S8 form a first set of switches of the second full bridge circuit 204 and the switches S6 and S7 for a second set of switches of the second full bridge circuit 204.

In some examples, the current controller 506 includes a proportional-integral (PI) controller 510. The PI controller 510 can adjust the value of the phase shift angle δ for the power equation in Equation 10, where the power is fixed.

The control circuit 212 also receives a representation of the first voltage source HV in RMS and a representation of the second voltage source LV in RMS, such as scaled versions of those voltages. Using the Fundamental Harmonic Matching Technique (FHMT), as described above, the first harmonics of the first full bridge circuit 202 and the product of the turns ratio of the transformer and the second full bridge circuit 204 output voltages HV, LV are matched.

The calculate modulation angle circuit 512 compares a representation of a first harmonic of the first voltage source HV and a representation of the product of the turns ratio of the transformer and a first harmonic of the second voltage source LV, determines an adjustment factor ζ that, when applied, reduces a difference between the representation of the first harmonic of the first voltage and the representation of the product of the turns ratio of the transformer and the first harmonic of the second voltage. The calculate modulation angle circuit 512 determines, using the adjustment factor ζ, a second phase shift angle α (where α=π−ζ) that, when applied to a control signal of at least one of the electronic switches S1-S4 or to a control signal of at least one of the electronic switches S5-S8, reduces a peak current in the inductor L. For example, the control circuit 212 can use the PWM controller 514 to adjust the control signal of at least one of the electronic switches S1-S4 or the PWM controller 508 to adjust the control signal of at least one of the electronic switches S5-S8.

A control circuit 212 is configured to, among other things, generate controls signals to control operation of the switches S1-S8 so that the first full bridge circuit 202 and the second full bridge circuit 204 can generate the voltages V1, V2, respectively. The sets of switches (S1, S2), (S4, S3), (S5, S6) and (S8, S7) are complementary pairs with each switch operating at 50% duty cycle respectively. Thus, if the switch S1 is ON then the switch S2 will be OFF and if the switch S1 is OFF then the switch S2 will be ON, for example.

For both buck and boost operation, the first full bridge circuit 202 is phase shifted by α. The second full bridge circuit 204 is phase shifted by power angle δ.

Figure 6:
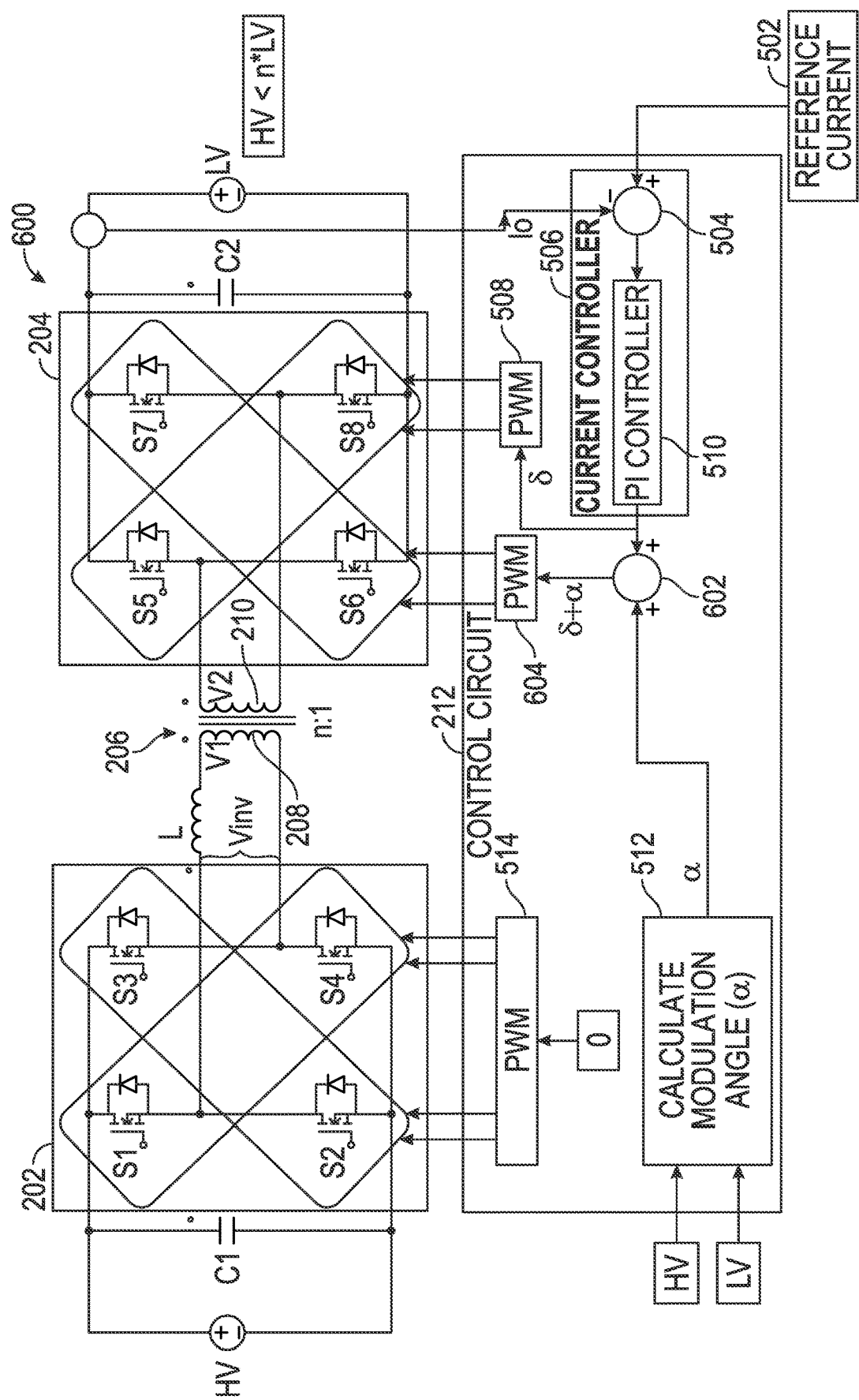
FIG. 6 is a schematic illustration of a dual active bridge DC/DC converter during the second mode of operation where HV<n*LY.

FIG. 6 is an example of a dual active bridge DC/DC converter during a second mode of operation where HV<n*LV. FIG. 6 includes some components that are similar to components in FIGS. 2 and 5, which are designated by similar reference numbers. For the sake of brevity, similar components will not be described in detail again.

The current controller 506 is configured to compare the representation of the load current Io and the representation of the reference current, determine a first phase shift angle δ based on the comparison, and then adjust, based on the determined first phase shift angle δ, a control signal of at least one of the plurality of electronic switches S5-S8, such as using the pulse width modulation (PWM) controller 508. As seen in FIG. 5, the switches S5 and S8 form a first set of switches of the second full bridge circuit 204 and the control signals of the switches S5 and S8 are adjusted by first phase shift angle δ.

For both buck and boost operation, the first full bridge circuit 202 is not phase shifted. Instead, the switches S6 and S7 of a second set of switches of the second full bridge circuit 204 are phase shifted by a sum of the modulation angle shift a and the power angle δ. As seen in FIG. 6, the output of the current controller 506 and the second phase shift angle α from the calculate modulation angle circuit 512 are applied to a summing node 602. The sum is then applied to a PWM controller 604, which adjusts the control signals applied to the switches S6, S7 of the second full bridge circuit 204. In this manner, the first phase shift angle δ is applied to the control signal of at least one of the electronic switches S5, S8 of the second full bridge circuit 204, and the second phase shift angle δ is adjusted by the first phase shift angle α and applied to the control signal of at least one of electronic switches S6, S7 of the second full bridge circuit 204.

Figure 7:
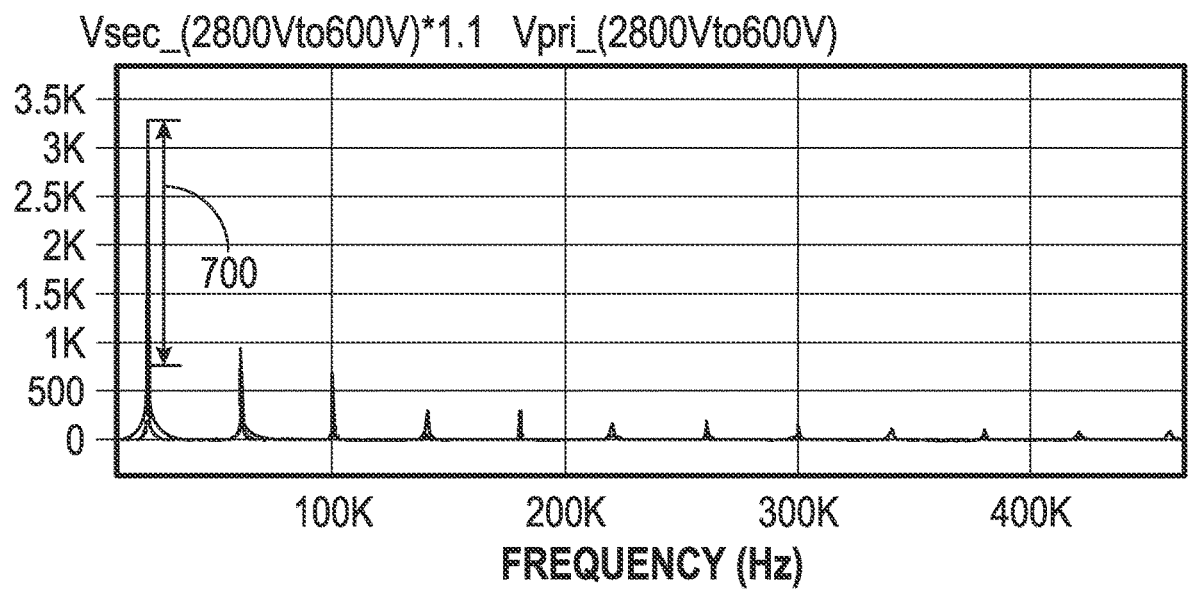
FIG. 7 is a graph of a fast Fourier transform (FFT) of a simulation of the primary and secondary side RMS voltage waveforms referred to the primary side in a conventional dual active bridge DC/DC converter.

FIG. 7 is a graph of a fast Foutier transform (FFT) of a simulation of the primary and secondary side RMS voltage waveforms referred to the primary side in a conventional dual active bridge DC/DC converter. The x-axis represents frequency in Hertz (Hz) and the y-axis represents voltage. As seen at 700, there is a large voltage difference between the first harmonics of primary and secondary voltages in the conventional dual active bridge DC/DC converter.

Figure 8:
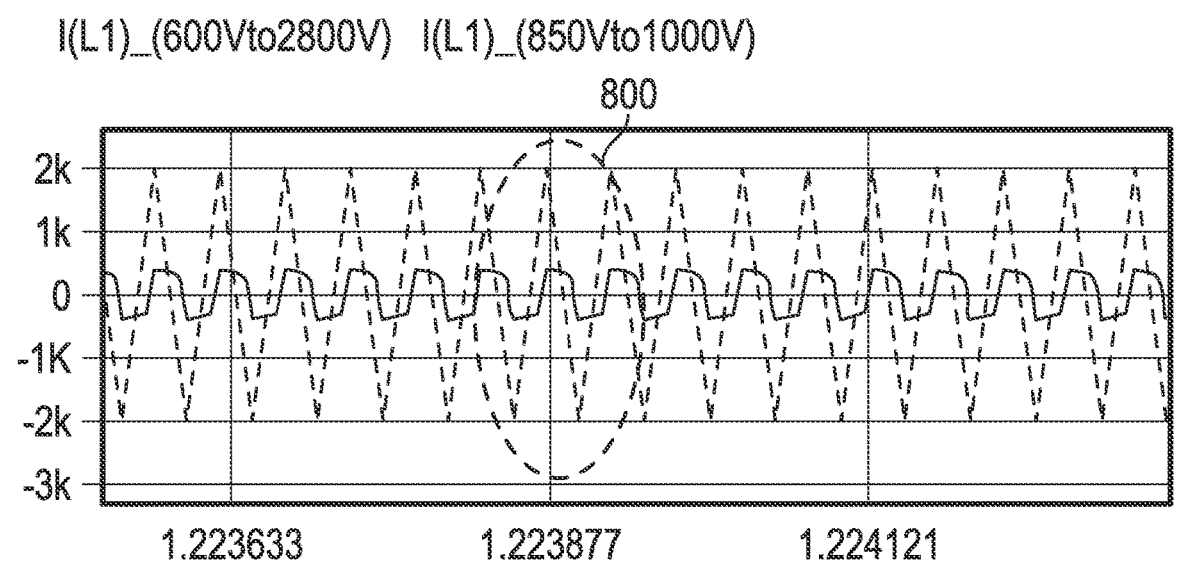
FIG. 8 is a graph of a simulation of inductor current waveforms in the conventional dual active bridge DC/DC converter.

FIG. 8 is a graph of a simulation of inductor current waveforms in a conventional dual active bridge DC/DC converter. The x-axis represents time in seconds and the y-axis represents current. As seen at 800, there are large current spikes, e.g., close to 2000 amps, in the conventional dual active bridge DC/DC converter, due to the large voltage differences that are shown in FIG. 7.

Figure 9:
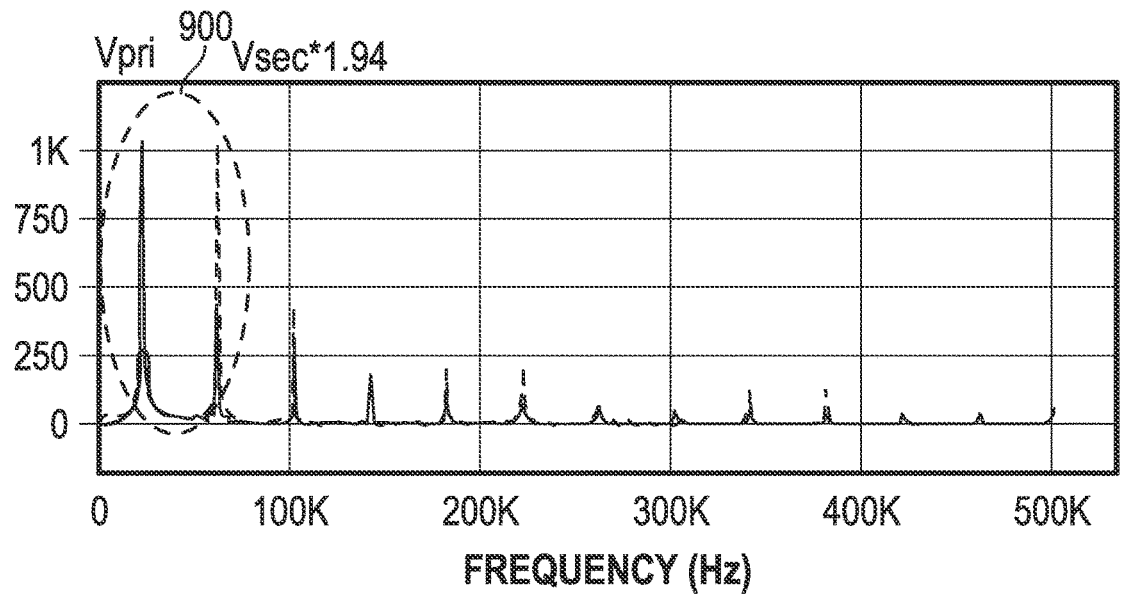
FIG. 9 is a graph of an FFT of a simulation of the primary and secondary side voltage waveforms referred to the primary side in the dual active bridge DC/DC converter that implements various techniques in accordance with embodiments of this disclosure.

FIG. 9 is a graph of an FFT of a simulation of the primary and secondary side voltage waveforms referred to the primary side in a dual active bridge DC/DC converter that implements various techniques of this disclosure. The x-axis represents frequency in Hertz (Hz) and the y-axis represents RMS voltage. The solid line in FIG. 9 represents the primary voltage and the dashed line represents the product of the secondary voltage and a turns ratio of a transformer. As seen at 900, there is little to no voltage difference between the first harmonics of the primary voltage and secondary voltages referred to the primary side in the dual active bridge DC/DC converter.

Figure 10:
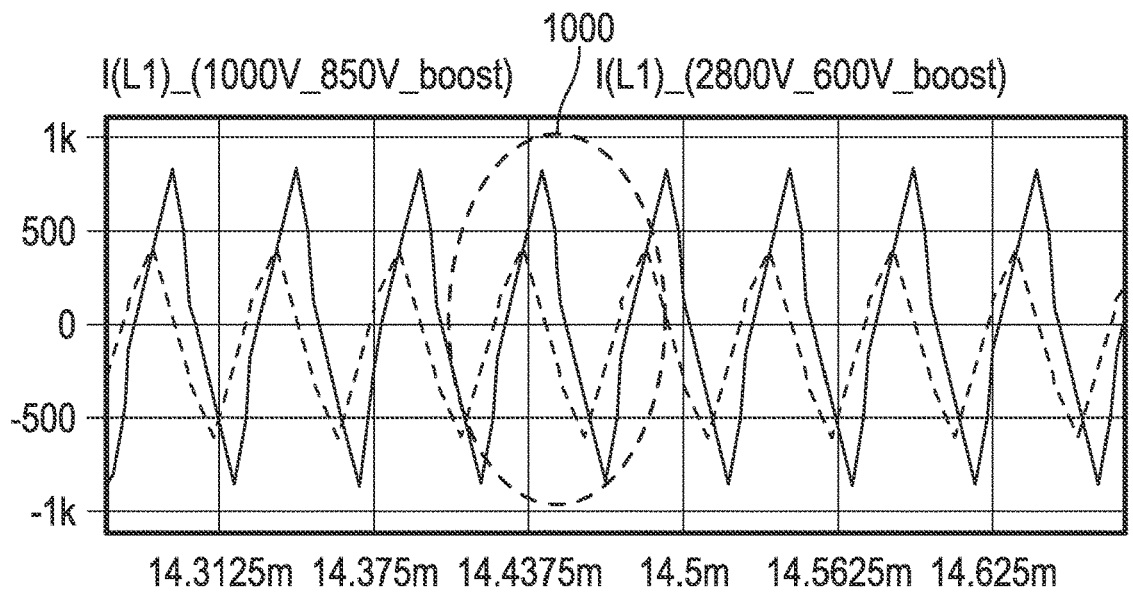
FIG. 10 is another graph of a simulation of inductor current waveforms in a dual active bridge DC/DC converter that implements various techniques of this disclosure.

FIG. 10 is another graph of a simulation of inductor current waveforms in a dual active bridge DC/DC converter that implements various techniques of this disclosure. The x-axis represents time in seconds and the y-axis represents current. As seen at 1000, the current spikes are significantly reduced when compared to the conventional dual active bridge DC/DC convert techniques of FIG. 8.

FIGS. 9 and 10 illustrate that by using the techniques of this disclosure, the fundamental harmonic of the primary and the secondary voltages are matched through the modulation angle ζ using the Fundamental Harmonic matching technique (FHMT), thereby overcoming the drawbacks of the conventional DAB by reducing the peak current significantly.

FIG. 11 is a diagrammatic view of an example of an electric powertrain using the DC/DC converter of the present disclosure. The powertrain 1100 can be used in combination with an electric machine, such as the electric machine 100 of FIG. 1. In the examples shown, the powertrain 1100 includes a DC power source 1102, such as one or more battery modules that each include one or more battery cells. The DC power source 1102 is coupled to a dual active bridge DC/DC converter 1104 configured to implement various techniques of this disclosure, such as the dual active bridge DC/DC converter 500 of FIG. 5 and/or the dual active bridge DC/DC converter 600 of FIG. 6.

The dual active bridge DC/DC converter 1104 is coupled to an inverter 1106, which generates an AC voltage from the output of the dual active bridge DC/DC converter 1104. An electrically drivable load 1108, such as a motor of an electric machine is coupled to the inverter 1106.

FIG. 12 is a flow diagram of a method 1200 of reducing an inductor current in the dual active bridge DC/DC converter, in accordance with an embodiment of the present disclosure. As disclosed earlier herein, the dual active bridge DC/DC converter includes a first full bridge circuit having a first plurality of electronic switches, the first full bridge circuit configured to generate a first voltage, a second full bridge circuit including a second plurality of electronic switches, the second full bridge circuit configured to generate a second voltage, a transformer coupled between the first full bridge circuit and the second full bridge circuit, and an inductor coupled between the first full bridge circuit and a primary winding of the transformer, such as shown in FIG. 2.

At block 1202, the method 1200 includes comparing a representation of a first harmonic of the first voltage and a representation of a first harmonic of the second voltage.

At block 1204, the method 1200 includes determining an adjustment factor that, when applied, reduces a difference between the representation of the first harmonic of the first voltage and the representation of a first harmonic of the second voltage.

At block 1206, the method 1200 includes determining, using the adjustment factor, a phase shift angle that, when applied to a control signal of at least one of the first plurality of electronic switches or to a control signal of at least one of the second plurality of electronic switches, reduces a peak current in an inductor coupled between the first full bridge circuit and the primary winding of the transformer.

In some examples, the phase shift angle is a first phase shift angle and the method 1200 optionally includes comparing a representation of a load current and a representation of a reference current, determining a second phase shift angle based on the comparison, and adjusting, based on the determined second phase shift angle, a control signal of at least one of the second plurality of electronic switches.

In some examples, the first full bridge circuit is coupled to the primary winding of the transformer and the method 1200 optionally includes when a voltage of a first voltage source coupled to the first full bridge circuit is greater than or equal to a product of a turns ratio of the transformer and a voltage of a second voltage source coupled to the second full bridge circuit: applying the first phase shift angle to the control signal of at least one of the first plurality of electronic switches and the second phase shift angle is applied to the control signal of at least one of the second plurality of electronic switches.

In some examples, the first full bridge circuit is coupled to the primary winding of the transformer and the method 1200 optionally includes when a voltage of a first voltage source coupled to the first full bridge circuit is less than a product of a turns ratio of the transformer and a voltage of a second voltage source coupled to the second full bridge circuit: applying no phase shift angle to the control signal of any of the first plurality of electronic switches.

The method 1200 optionally includes generating, using the first full bridge circuit, an output voltage having a modulated square waveform; and generating, using the second full bridge circuit, an output voltage having an unmodulated square waveform.

The method 1200 optionally includes applying the second phase shift angle to the control signal of at least one electronic switch of a first pair of the second plurality of electronic switches; and adjusting the second phase shift angle by the first phase shift angle and applying to the control signal of at least one of electronic switch of a second pair of the second plurality of electronic switches.

The method 1200 optionally includes generating, using the first full bridge circuit, an output voltage having an unmodulated square waveform; and generating, using the second full bridge circuit, an output voltage having a modulated square waveform.

INDUSTRIAL APPLICABILITY

In high power applications, bridge-type bidirectional DC/DC converters are common choices for power transfer units. The dual active full bridge DC/DC converter is usually used to transfer power. The dual active bridge DC/DC converter (DAB) is a buck and a boost bidirectional DC/DC converter, based on two active bridges interfaced through a high frequency transformer. The power flow is controlled by switching both the active bridges in order to obtain a phase shift angle different, or delta, between the voltages imposed by the bridges.

Although conventional dual active bridge control is known to have bidirectional power flow capability that meets the various converter requirements, it has certain challenges associated with it, such as high peak current and RMS current flowing through its transformer due to high instantaneous voltage drop across the inductor. These can cause high switching power loss by the switching devices in the converter, which can potentially impose a heavy cooling requirement to maintain the junction temperature of switching devices within acceptable limits of system design. Also, due to the high peak current, the device ratings of the switching devices, transformer, and the inductor of the DAB need to be rated for high current.

This disclosure describes a fundamental harmonic matching control technique (FHMT) to overcome these challenges. The FHMT control allows optimizing the use of the switching devices needed to operate the dual active bridge DC/DC converter, which reduces the peak and RMS currents thereby reducing the current rating of the switching devices, transformer, and the inductor of the dual active bridge DC/DC converter.

The above detailed description is intended to be illustrative, and not restrictive. The scope of the disclosure should, therefore, be determined with references to the appended claims, along with the full scope of equivalents to which such claims are entitled.

The invention claimed is:

1. A dual active bridge DC/DC converter comprising:
   a first full bridge circuit including a first plurality of electronic switches, the first full bridge circuit configured to generate a first voltage;
   a second full bridge circuit including a second plurality of electronic switches, the second full bridge circuit configured to generate a second voltage;
   a transformer coupled between the first full bridge circuit and the second full bridge circuit;
   an inductor coupled between the first full bridge circuit and a primary winding of the transformer; and
   a control circuit configured to:
   compare a representation of a first harmonic of the first voltage and a representation of a first harmonic of the second voltage;
   determine an adjustment factor that, when applied, reduces a difference between the representation of the first harmonic of the first voltage and the representation of the first harmonic of the second voltage; and
   determine, using the adjustment factor, a phase shift angle that, when applied to a control signal of at least one of the first plurality of electronic switches or to a control signal of at least one of the second plurality of electronic switches, reduces a peak current in the inductor.

2. The dual active bridge DC/DC converter of claim 1, wherein the phase shift angle is a first phase shift angle, and wherein the control circuit includes:
   a current controller configured to:
   compare a representation of a load current and a representation of a reference current;
   determine a second phase shift angle based on the comparison; and
   adjust, based on the determined second phase shift angle, a control signal of at least one of the second plurality of electronic switches.

3. The dual active bridge DC/DC converter of claim 2, wherein the first full bridge circuit is coupled to the primary winding of the transformer, wherein when a voltage of a first voltage source coupled to the first kill bridge circuit is greater than or equal to a product of a turns ratio of the transformer and a voltage of a second voltage source coupled to the second full bridge circuit, the first phase shift angle is applied to the control signal of at least one of the first plurality of electronic switches and the second phase shift angle is applied to the control signal of at least one of the second plurality of electronic switches.

4. The dual active bridge DC/DC converter of claim 2, wherein the first full bridge circuit is coupled to the primary winding of the transformer, wherein when a voltage of a first voltage source coupled to the first full bridge circuit is less than a product of a turns ratio of the transformer and a voltage of a second voltage source coupled to the second full bridge circuit, no phase shift angle is applied to the control signal of any of the first plurality of electronic switches.

5. The dual active bridge DC/DC converter of claim 4, wherein the first full bridge circuit is configured to generate an output voltage having a modulated square waveform, and wherein the second full bridge circuit is configured to generate an output voltage having an unmodulated square waveform.

6. The dual active bridge DC/DC converter of claim 2, wherein the second phase shift angle is applied to the control signal of at least one electronic switch of a first pair of the second plurality of electronic switches, and wherein the second phase shift angle is adjusted by the first phase shift angle and applied to the control signal of at least one of electronic switch of a second pair of the second plurality of electronic switches.

7. The dual active bridge DC/DC converter of claim 6, wherein the first full bridge circuit is configured to generate an output voltage having an unmodulated square waveform, and wherein the second full bridge circuit is configured to generate an output voltage having a modulated square waveform.

8. The dual active bridge DC/DC converter circuit of claim 2, wherein the current controller includes a proportional-integral (PI) controller.

9. A method of reducing an inductor current in a dual active bridge DC/DC converter, wherein the dual active bridge DC/DC converter includes a first full bridge circuit having a first plurality of electronic switches, the first full bridge circuit configured to generate a first voltage, a second full bridge circuit including a second plurality of electronic switches, the second full bridge circuit configured to generate a second voltage, a transformer coupled between the first full bridge circuit and the second full bridge circuit, and an inductor coupled between the first full bridge circuit and a primary winding of the transformer, the method comprising:
  comparing a representation of a first harmonic of the first voltage and a representation of a first harmonic of the second voltage;
  determining an adjustment factor that, when applied, reduces a difference between the representation of the first harmonic of the first voltage and the representation of a first harmonic of the second voltage; and
  determining, using the adjustment factor, a phase shift angle that, when applied to a control signal of at least one of the first plurality of electronic switches or to a control signal of at least one of the second plurality of electronic switches, reduces a peak current in an inductor coupled between the first full bridge circuit and the primary winding of the transformer.

10. The method of claim 9, wherein the phase shift angle is a first phase shift angle, wherein the method comprises:
  comparing a representation of a load current and a representation of a reference current;
  determining a second phase shift angle based on the comparison; and
  adjusting, based on the determined second phase shift angle, a control signal of at least one of the second plurality of electronic switches.

11. The method of claim 10, wherein the first full bridge circuit is coupled to the primary winding of the transformer, the method comprising:
  when a voltage of a first voltage source coupled to the first full bridge circuit is greater than or equal to a product of a turns ratio of the transformer and a voltage of a second voltage source coupled to the second full bridge circuit:
    applying the first phase shift angle to the control signal of at least one of the first plurality of electronic switches and the second phase shift angle is applied to the control signal of at least one of the second plurality of electronic switches.

12. The method of claim 10, wherein the first full bridge circuit is coupled to the primary winding of the transformer, the method comprising:
  when a voltage of a first voltage source coupled to the first full bridge circuit is less than a product of a turns ratio of the transformer and a voltage of a second voltage source coupled to the second full bridge circuit:
    applying no phase shift angle to the control signal of any of the first plurality of electronic switches.

13. The method of claim 12, comprising:
  generating, using the first full bridge circuit, an output voltage having a modulated square waveform; and
  generating, using the second full bridge circuit, an output voltage having an unmodulated square waveform.

14. The method of claim 10, comprising:
  applying the second phase shift angle to the control signal of at least one electronic switch of a first pair of the second plurality of electronic switches; and
  adjusting the second phase shift angle by the first phase shift angle and applying to the control signal of at least one of electronic switch of a second pair of the second plurality of electronic switches.

15. The method of claim 14, comprising
  generating, using the first full bridge circuit, an output voltage having an unmodulated square waveform; and
  generating, using the second full bridge circuit, an output voltage having a modulated square waveform.

16. An electric powertrain comprising:
  an electrically drivable load;
  a DC power source; and
  a dual active bridge DC/DC converter coupled to the DC power source, the dual active bridge DC/DC converter comprising:
    a first full bridge circuit including a first plurality of electronic switches, the first full bridge circuit configured to generate a first voltage;
    a second full bridge circuit including a second plurality of electronic switches, the second full bridge circuit configured to generate a second voltage;
    a transformer coupled between the first full bridge circuit and the second full bridge circuit;
    an inductor coupled between the first full bridge circuit and a primary winding of the transformer; and
    a control circuit configured to:
      compare a representation of a first harmonic of the first voltage and a representation of a first harmonic of the second voltage;
      determine an adjustment factor that, when applied, reduces a difference between the representation of the first harmonic of the first voltage and the representation of the first harmonic of the second voltage; and
      determine, using the adjustment factor, a phase shift angle that, when applied to a control signal of at least one of the first plurality of electronic switches or to a control signal of at least one of the second plurality of electronic switches, reduces a peak current in the inductor.

17. The electric powertrain of claim 16, comprising:
  an inverter coupled to the dual active bridge DC/DC converter circuit.

18. The electric powertrain of claim 16, wherein the phase shift angle is a first phase shift angle, and wherein the control circuit includes:
  a current controller configured to:
    compare a representation of a load current and a representation of a reference current;

determine a second phase shift angle based on the comparison; and adjust, based on the determined second phase shift angle, a control signal of at least one of the second plurality of electronic switches.

19. The electric powertrain of claim 18, wherein the first full bridge circuit is coupled to the primary winding of the transformer, wherein when a voltage of a first voltage source coupled to the first full bridge circuit is greater than or equal to a product of a turns ratio of the transformer and a voltage of a second voltage source coupled to the second full bridge circuit, the first phase shift angle is applied to the control signal of at least one of the first plurality of electronic switches and the second phase shift angle is applied to the control signal of at least one of the second plurality of electronic switches.

20. The electric powertrain of claim 18, wherein the first full bridge circuit is coupled to the primary winding of the transformer, wherein when a voltage of a first voltage source coupled to the first full bridge circuit is less than a product of a turns ratio of the transformer and a voltage of a second voltage source coupled to the second full bridge circuit, no phase shift angle is applied to the control signal of any of the first plurality of electronic switches.

* * * * *